United States Patent [19]

Lestelle

[11] Patent Number: 4,706,506
[45] Date of Patent: Nov. 17, 1987

[54] PICKUP FOR MEASURING FORCES AND TORQUES AND APPLICATION OF SUCH A PICKUP TO A FOLLOWER AND A GRIPPER

[75] Inventor: Dominique Lestelle, Montrouge, France

[73] Assignee: Commissariat a l'Energie Atomique, France

[21] Appl. No.: 922,750

[22] Filed: Oct. 24, 1986

[30] Foreign Application Priority Data

Oct. 25, 1985 [FR] France ................ 85 15886

[51] Int. Cl.⁴ ..................... G01L 5/16; G01L 1/22
[52] U.S. Cl. ........................ 73/862.04; 73/862.65
[58] Field of Search ........... 73/862.04, 862.05, 862.06, 73/862.65, 147, 117.4

[56] References Cited

U.S. PATENT DOCUMENTS

| | | |
|---|---|---|
| 3,434,342 | 3/1969 | Kazmarek . |
| 3,561,263 | 2/1971 | Ward et al. ................ 73/862.04 |
| 4,178,799 | 12/1979 | Schmieder et al. ........... 73/862.04 |
| 4,367,532 | 1/1983 | Crum et al. . |
| 4,478,089 | 10/1984 | Aviles et al. . |
| 4,520,679 | 6/1985 | Hatamura ................ 73/862.04 |

OTHER PUBLICATIONS

"A new device for simultaneous measurement of friction force, normal force and friction coefficient" by Mittmann et al., Wear, vol. 31, No. 1, (Jan. 1975), pp. 179–184.

*Primary Examiner*—Charles A. Ruehl
*Attorney, Agent, or Firm*—Michael N. Meller

[57] ABSTRACT

The base module of the pickup comprises two U-shaped supports, each having two measuring branches connected by an intermediate branch. These parts are placed in inverted manner, so that their longitudinal axes of symmetry Z coincide and their planes of symmetry XZ and YZ are orthogonal. Cylindrical links are provided between the ends of the measuring branches of each of the parts and the intermediate branch of the other part. By placing strain gauges on the measuring branches, it is possible to determine with very reduced overall dimensions the forces in three axes X, Y and Z and the moments of the torques about axes X and Y. Such a module, optionally completed by an auxiliary device for measuring the moment of the torque about axis Z can advantageously be used in a follower or in each of the fingers of a gripper, so as to obtain information on the contact torsor between the follower and the object or the gripper and the object.

12 Claims, 7 Drawing Figures

PICKUP FOR MEASURING FORCES AND TORQUES AND APPLICATION OF SUCH A PICKUP TO A FOLLOWER AND A GRIPPER

BACKGROUND OF THE INVENTION

The present invention relates to a pickup transducer or sensor for measuring forces and torques, which is remarkable as a result of its small overall dimensions and its modular character. The invention also relates to a follower or feeler and to a gripper using one or more pickups of this type.

In technical fields such as robotics and remote handling, it is often necessary to know the contact torsor between two solid objects. This is more particularly the case during the gripping of an object by a force return remote manipulator or by a robot. The knowledge of the contact torsor is also desirable in order to realize the insertion of an object into a part or when a follower has to follow the contour of an object with contact.

Most existing force and torque measuring pickups are wrist pickups placed at the end of the carrier supporting the gripper. These pickups normally make it possible to determine the forces exerted in three orthogonal axes and the moments of the torques about said three axes. Numerous models exist, reference being made e.g. to that of U.S. Pat. No. 4,094,192.

However, such wrist pickups have a number of disadvantages limiting the use thereof. Firstly they all have large overall dimensions, particularly in an orthogonal plane about their longitudinal axis of symmetry. Consequently the dimensions of these pickups cannot be sufficiently reduced to enable them to be directly placed in the fingers of a gripper. The wrist pickups thus make it possible to obtain information on the overall interaction between the gripper and the object to be gripped, but not the contact torsor between each of the fingers of the gripper and said object. Thus, the applications of such pickups are limited. Finally, such wrist pickups are generally sensitive to heat or are designed in such a way that the decoupling between the three forces and the three torques measured is difficult and requires very complex calculations.

Moreover, within the scope of very particular applications, certain force and torque measuring pickups have been designed so that they can be placed in the fingers of a gripper. However, these pickups are generally only sensitive to the forces and torques in one or two axes and they never make it possible to know the complete interaction torsor between each finger of a gripper and the object to be gripped. Thus, French patent application No. 2 520 279 describes a device making it possible to determine a force and two torques for each of the fingers of the gripper.

French patent No. 2 375 962 describes a gripper with two fingers, each having three plates located in orthogonal planes and operating in flexion, each plate being equipped with strain gauges. However, only three measurements are performed on each of the fingers, which in practice limits the applications of said device to the same cases as for the wrist pickups.

SUMMARY OF THE INVENTION

The present invention mainly relates to a force and torque measuring pickup making it possible to measure three forces and two or three torques in a small volume with very small overall dimensions in the plane orthogonal to the axis of symmetry of the pickup, which makes it possible to place said pickup directly in the finger of a gripper.

The invention also relates to a force and torque measuring pickup having a good decoupling between the measured quantities and whose modular character makes it possible to produce grippers in which each of the fingers is equipped with a pickup ensuring, as required, the desired number of measurements.

The present invention therefore relates to a pickup for measuring forces and torques, wherein it comprises two U-shaped parts, each having two measuring branches connected at their base by an intermediate branch, the branches of the same part passing through a plane of symmetry containing a longitudinal axis of symmetry Z, said parts being placed in reverse direction with said planes of symmetry of each part which are orthogonal with respect to one another, whilst their axes of symmetry coincide, the ends of the measuring branches of each of said parts being connected to the intermediate branch of the other part by two cylindrical links, each authorizing a rotation and a translation along the same axis X, Y orthogonal to the axis Z and parallel to the plane of symmetry of said other part, each of the measuring branches being able to deform in said plane of symmetry of the part to which said branch belongs, strain gauges being placed on these measuring branches so as to measure the forces exerted in three directions X, Y and Z and the moments of the torques about directions X and Y.

According to a particularly advantageous embodiment of the invention, each of the measuring branches has two parallel, opposite, planar faces orthogonal to said plane of symmetry of the part to which said branch belongs and parallel to said longitudinal axis of symmetry Z, the strain gauges being placed on these faces.

In order to measure the forces exerted in directions X and Y, four strain gauges are preferably arranged in pairs on the opposite faces of one of the measuring branches of each part. Preferably and for optimizing sensitivity, they are respectively located in the vicinity of the base and the end of said branch.

In a comparable manner, the forces exerted in direction Z are preferably measured by means of two strain gauges located on the opposite faces of one of the measuring branches of one of the parts and two other strain gauges placed on the opposite faces of one of the measuring branches of the other part.

Finally, the moments of the torques exerted about directions X and Y are preferably measured by means of four strain gauges placed on the opposite faces of two measuring branches of each of the parts, substantially at the same level along axis Z.

Preferably, each of the cylindrical links comprises a cylindrical pin traversing the end of one of the measuring branches and lugs formed on either side of said end on the intermediate branch of the U-shaped part to which said measuring branch does not belong, an elastic centring member being mounted on the pin between the end of the measuring branch and each of the lugs.

In a first constructional variant of the invention making it possible also to measure the moment of the torque about direction Z, the intermediate branch of one of said parts supports a gripper in rotary manner about axis Z, restoring or return means being provided for drawing the gripper towards an angular rest position about axis Z, measuring means being interposed between said part and the gripper to measure said rotation. The measuring means can in particular be magnetic or optical.

In a second constructional variant of the invention, the intermediate branch of one of the U-shaped parts rigidly supports a flexible member in torsion about axis Z, at least one pair of strain gauges being disposed on said member operating in torsion.

According to another feature of the invention, a follower able to follow the contour of the object by contact of the latter with the end of a rod mounted on a support has, between rod and support, a pickup constructed in the manner defined hereinbefore, the parts of the pickup being respectively fixed by their intermediate branches to the support and to the rod of the follower.

Finally, the invention also relates to a gripper having at least two gripping fingers, each incorporating a gripping end and a base by which the fingers are mounted in mobile manner on a support, wherein each gripping finger comprises a pickup, said U-shaped parts of each pickup being respectively fixed by their intermediate branches to the base and to the gripping end of the finger to which it belongs.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
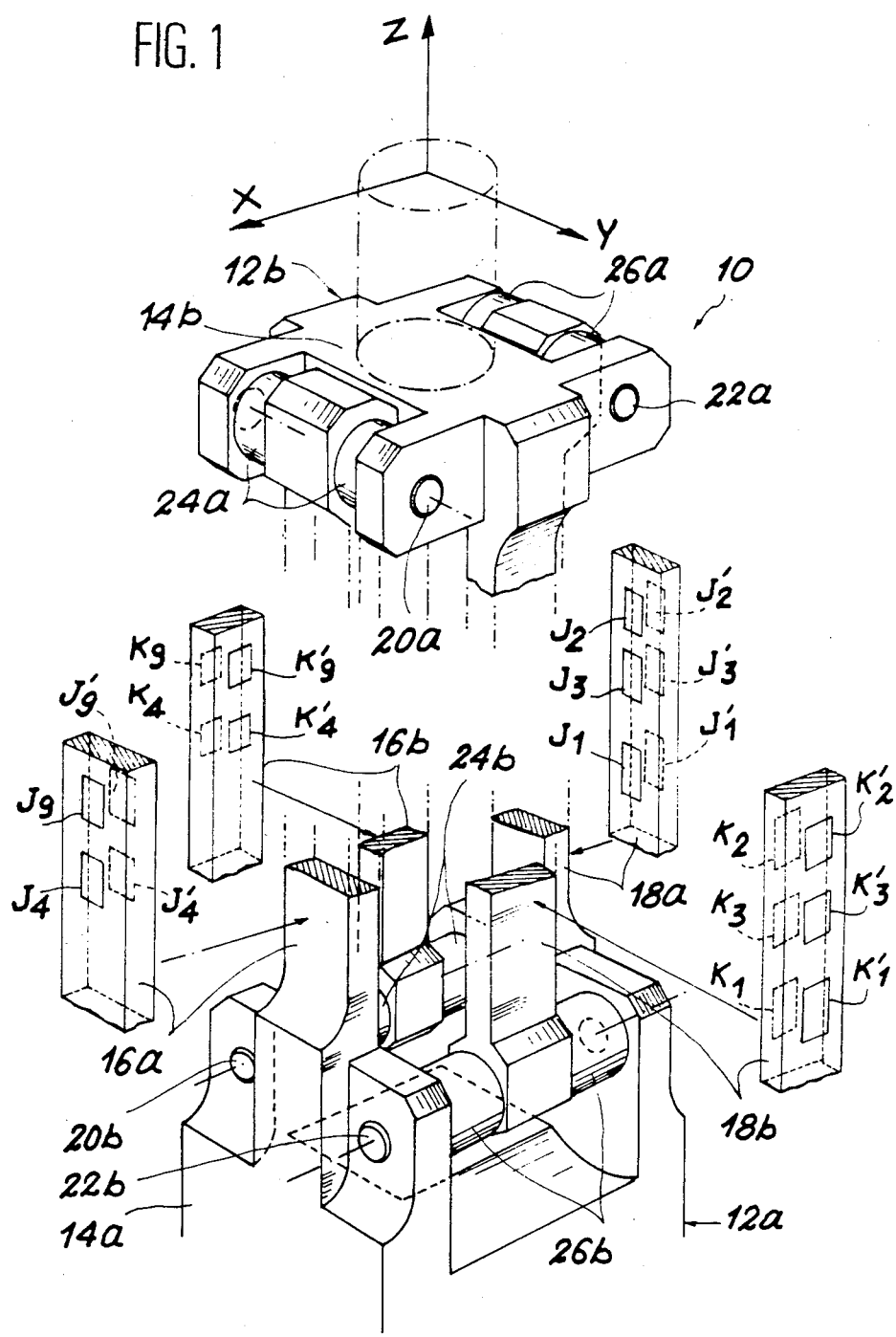
FIG. 1 A partly exploded perspective view showing a force and torque measuring pickup constructed according to the invention.

FIG. 1 shows the basic module of the pickup according to the invention making it possible to measure the forces applied along three orthogonal axes X, Y and Z as well as the moment of the torques about axes X and Y. This module, designated in general terms by the reference 10, will now be described in greater detail relative to FIG. 1.

Module 10 comprises two monolithic parts 12a, 12b, each being approximately U-shaped and are preferably identical. However, they can differ slightly, as illustrated in FIG. 1.

Part 12a comprises an intermediate branch 14a and two parallel measuring branches 16a, 18a connected by their base to branch 14a. In the same way, part 12b comprises an intermediate branch 14b and two parallel measuring branches 16b, 18b connected by their base to branch 14b. Taking account of its structure, each of the parts 12a, 12b has a plane of symmetry passing through each of the three branches forming it, as well as a longitudinal axis of symmetry.

Each of the measuring branches 16a, 18a and 16b, 18b has a uniform rectangular section over most of its length. The planar, parallel, opposite faces corresponding to the longer sides of said rectangular section are orthogonal to the plane of symmetry of the corresponding part and parallel to the longitudinal axis of symmetry of said part.

Throughout the remainder of the text, the term inner face will be used to define the face of each of the measuring branches turned towards the axis of symmetry of the corresponding part, whilst outer face will be used for the opposite face of said same branch.

As a result of this configuration, each of the measuring branches 16a, 18a and 16b, 18b behaves in the manner of a beam able to sag in the plane of symmetry of the part to which it belongs, whilst being relatively rigid in a direction orthogonal to this plane and to the axis of symmetry of the part.

Parts 12a, 12b are placed in an inverted or head-to-tail direction, so that their axes of symmetry coincide and their planes of symmetry defined hereinbefore are orthogonal. With respect to the thus positioned parts, the axes X, Y and Z are defined in such a way that axis Z corresponds to the common axis of symmetry of the two parts 12a, 12b, axes X and Y being perpendicular to axis Z and respectively contained in the plane of symmetry of part 12a and in the plane of symmetry of part 12b.

More specifically parts 12a and 12b are fitted into one another, in such a way that the ends of branches 16b, 18b face branch 14a and the ends of branches 16a, 18a face branch 14b. Parts 12a, 12b are interconnected by four cylindrical links, each authorizing a limited rotation and translation.

Two of these cylindrical links are realized by means of cylindrical pins 20a, 22a respectively traversing the ends of each of the branches 16a, 18a. These pins 20a, 22a also traverse lugs formed on the intermediate branch 14b and projecting on either side of the end of each of the branches 16a, 18a. The axes of pins 20a, 22a are parallel to one another and extend parallel to the previously defined axis Y.

So as to permit a slight translation in one or other direction of the ends of branches 16a, 18a with respect to the intermediate branch 14b, whilst ensuring their relative centring, elastic washers 24a, 26a with a very limited hysteresis are placed on pins 20a, 22a, respectively between the ends of branches 16a, 18a and the lugs formed on branch 14b.

The two other cylindrical links are obtained through cylindrical pins 20b, 22b, which respectively traverse the ends of branches 16b, 18b, as well as lugs formed on either side of these ends on intermediate branch 14a. The axes of pins 20b, 22b are parallel to one another, as well as to the previously defined axis X.

Elastic washers 24b, 26b are also placed on pins 20b, 22b between the ends of branches 16b, 18b and the lugs formed on branch 14a. A relative displacement between the ends of branches 16b, 18b and the intermediate branch 14a, as well as an automatic centring of these branches are obtained in this way.

Obviously, elastic washers 24a, 26a and 24b, 26b could be replaced by any other low hysteresis elastic centring device, such as metal washers or springs.

As a result of the structure described hereinbefore, the application of a relative force parallel to axis X between parts 12a and 12b has the effect of bending in this direction branches 16a and 18a of part 12a, whilst there is substantially no bending of branches 16b and 18b of part 12b, the displacement along X produced between parts 12a, 12b under the action of bending of branch 16a, 18a being compensated by elastic washers 24b and 26b.

Conversely, the application of a relative force in direction Y between parts 12a, 12b has the effect of causing a deformation in said same direction of branches 16b, 18b of part 12b, said deformation being compensated by the deformation of elastic washers 24a and 26a.

The application of a force in longitudinal direction Z between parts 12a, 12b has the effect of making each of the branches 16a, 18a, 16b, 18b work simultaneously in traction or in compression.

When a rotary torque about axis X is applied to one or other of parts 12a, 12b, this has the effect of making one of the branches 16b, 18b work in traction and the other in compression. In a comparable manner, when a twisting torque is applied about axis Y, one of the branches 16a, 18a of part 12a works in flexion and the other branch of said same part works in compression.

In order to measure the forces along X, Y and Z and the rotary torques about axes X and Y, it is consequently sufficient to equip the measuring branches 16a, 18a, 16b, 18b of the two parts constituting the pickup 10 with two gauges making it possible to measure the stresses or strains induced in the different branches by these forces and torques, as analyzed hereinbefore.

Thus, for measuring the forces Fx in direction X, the branches 16a, 18a of part 12a (branch 18a in FIG. 1) is equipped with a first series or row of four gauges J1, J2, J'1, J'2 making it possible to measure the bending of said branch. More specifically, gauges J1 and J2 are placed on the inner face of branch 18a and gauges J'1, J'2 on the outer face of the same branch, gauges J1 and J'1 being positioned in the vicinity of the base of said branch, whereas gauges J2 and J'2 are placed in the vicinity of its end.

In a comparable manner, four gauges K1, K2, K'1, K'2 are mounted on one of the measuring branches of part 12b (branch 18b in FIG. 1), in order to measure the bending of said branch under the effect of a force Fy in direction Y. Gauges K1, K2 are mounted on the inner face of branch 18b and gauges K'1, K'2 on the outer face of the same branch. Gauges K1, K'1 are placed in the vicinity of the end of branch 18b, whereas gauges K2, K'2 are close to the base of said branch.

The bending or flexion work resulting from the forces in directions X and Y produces large surface deformations, so that gauges J1, J2, J'1, J'2 and K1, K2 and K'1, K'2 can be relatively insensitive gauges, such as pellicular screen gauges.

It has been seen that the application of a force Fz in direction Z simultaneously subjects the measuring branches of the two parts either to tensile stresses or to compressive stresses. To measure these forces or stresses, use is made of a row of four gauges J9, J'9, K9, K'9 arranged in pairs on the opposite faces of one of the measuring branches of part 12a and on the opposite faces of one of the measuring branches of part 12b (branches 16a, 16b in FIG. 1).

More specifically, gauges J9, J'9 are respectively mounted on the outer and inner faces of branch 16a, in the vicinity of the end thereof and gauges K9, K'9 are respectively placed on the outer and inner faces of branch 16b in the vicinity of the base thereof.

Moreover, the sensitive axes of gauges J9, J'9 mounted on branch 16a are orthogonal to the sensitive axes of gauges K9, K'9 mounted on branch 16b. Thus, if the sensitive axes of gauges J9, J'9 are oriented along Z, the sensitive axes of gauges K9, K'9 are oriented along X. Conversely, if the sensitive axes of gauges J9, J'9 are oriented along Y, the sensitive axes of gauges K9, K'9 are oriented along Z.

The application of a rotary torque about axis X has the effect of applying a tensile stress to one of the measuring branches of part 12b and a compressive stress to the other measuring branch of said same part, the measurement of the moment Mx of said torque being effected by means of a group of four gauges K3, K'3, K4, K'4 mounted in pairs on each of these branches. More specifically, gauges K3 and K'3 are respectively mounted on the inner and outer faces of branch 18b approximately in the centre thereof and gauges K4, K'4 are respectively mounted on the outer and inner faces of branch 16b in the vicinity of the centre thereof.

In a comparable manner, a row of four gauges J3, J'3, J4, J'4 are mounted on branches 16a, 18a of part 12a for measuring the moment My of the torque about axis Y. More specifically, gauges J3 and J'3 are respectively mounted on the inner and outer faces of branch 18a roughly in the centre thereof and gauges J4, J'4 are respectively mounted on the outer and inner faces of branch 16a roughly in the centre thereof.

In view of the fact that the deformations of the measuring branches resulting from the tensile and compressive stresses exerted thereon are relatively small, gauges J9, J'9, K'9, J3, J'3, J4, J'4, K3, K'3, K4, K'4 are preferably gauges having a good sensitivity, such as semiconductor gauges.

Figure 2:
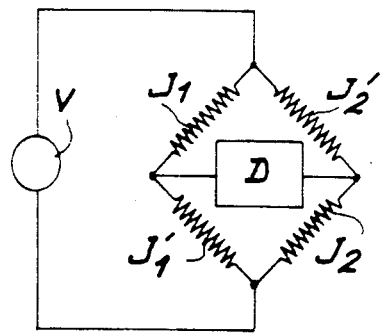
FIG. 2 The electric circuit associated with a first series of gauges mounted on the pickup of FIG. 1, similar circuits being associated with each of the five series of gauges carried by the pickup, so as to make it possible to measure three forces and two torques.

The gauges constituting each of the groups of gauges making it possible to measure the forces or stresses $F_X$, $F_Y$ and $F_Z$, as well as the moments $M_X$, $M_Y$ of the torques about axes X and Y are mounted in identical electric circuits, whereof one is shown in exemplified manner in FIG. 2.

FIG. 2 more specifically shows the electric circuit making it possible to measure the force $F_X$ in direction X by means of gauges J1, J2, J'1, J'2. For this purpose, these four gauges are connected to form a Wheastone bridge, gauge J1 being connected between two terminals of gauges J'1 and J'2, whereas gauge J2 is connected to the two other terminals of gauges J'1, J'2. A voltage V or current I source is connected between the common terminal to the gauges J1 and J'2 and between the common terminal to the gauges J2, J'1. The voltage or current measured by device D between the common terminals to gauges J1, J'1 and the common terminals to gauges J2, J'2 is representative of signal $F_X$.

A comparable circuit is formed with gauges K1, K2, K'1, K'2 for measuring signal $F_Y$. In this circuit, gauges K'1, K2, K1, K'2 respectively replace gauges J1, J2, J'1, J'2 in FIG. 2.

The electric circuit making it possible to determine the force or stress $F_Z$ in direction Z is also identical to the circuit shown in FIG. 2, gauges K9, K'9, J9, J'9 respectively replacing gauges J1, J2, J'1, J'2.

In the same way, the measurement of the moment of torque $M_Y$ about axis Y takes place with the aid of a circuit identical to that of FIG. 2, gauges J1, J2, J'1, J'2 being respectively replaced by gauges J4, J'4, J3, J'3.

Finally, moment $M_X$ of the torque about axis X is also obtained with the aid of a circuit identical to that of FIG. 2, gauges J1, J2, J'1, J'2 being respectively replaced by gauges K4, K'4, K3, K'3.

In the case of torque measurements, the strain measuring gauges are located substantially at the same distance with respect to the origin of the pickup. As a result of the pickup shown in FIG. 1 and the electric circuits in which the strain gauges of said pickup are located, it is possible to measure the three forces or stresses $F_X$ $F_Y$ and $F_Z$ in direction X, Y and Z and the two torques $M_Y$, $M_X$ in directions Y and X.

According to an interesting improvement of the pickup described hereinbefore, the moment $M_Z$ of the torque applied about longitudinal axis Z of the pickup can also be determined. A first solution shown in FIGS. 3 to 5 will now be described.

Figure 3:
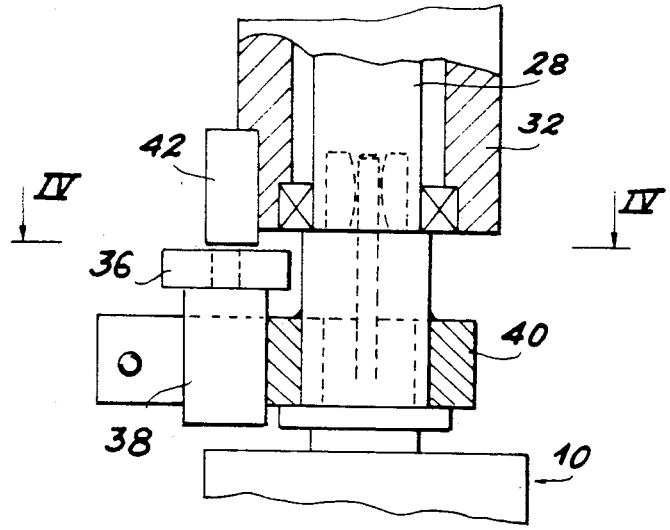
FIG. 3 In partial longitudinal section, a constructional variant of the pickup of FIG. 1, in which a magnetic device is interposed between one of the parts of the pickup and a gripper, so as to make it possible to measure the moment of the torque about the longitudinal axis Z of the pickup.
Figure 4:
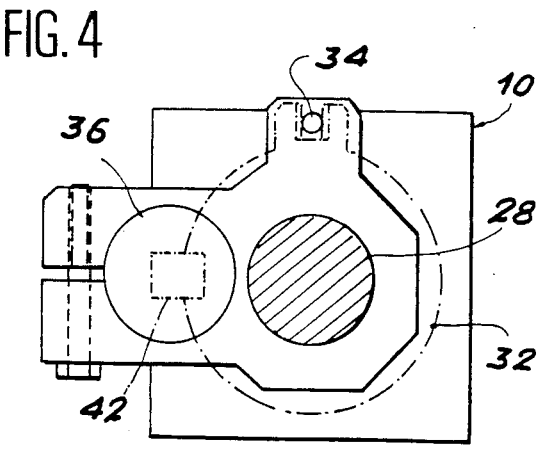
FIG. 4 A sectional view along line IV—IV of FIG. 3.

In FIGS. 3 and 4 it can be seen that module 10 is extended along its longitudinal axis Z in the form of a cylindrical rod 28. Parts 12a, 12b are identical, so that as required rod 18 is fixed either to branch 14a of part 12a, or to branch 14b of part 12b. Rod 28 supports in rotary manner, by means of bearings 30, a gripper 32. The angular position of said part 32 about axis Z is determined in the inoperative state by a return spring 34 interposed between part 32 and parts 12a or 12b of module 10 supporting rod 28.

As a result of this configuration, when a relative rotary torque about axis Z is applied between gripper 32 and module 10, there is a rotation in one or other direction of part 32 about axis Z with respect to the inoperative position determined by return spring 34. This relative rotation can be measured with the aid of different known means and in particular a not shown optical or magnetic system.

In the embodiment shown in FIGS. 3 and 4, said measurement is performed by means of a magnetic system constituted by a differential magnetoresistor 36 coupled to a magnet 38 mounted on a support 40, which is itself fixed to rod 28 in the immediate vicinity of module 10. By mounting on gripper 32 a soft iron part 42, normally positioned facing magnetoresistor 36 when no torque is applied about axis Z, it is possible in this way to measure the moment $M_Z$.

Figure 5:
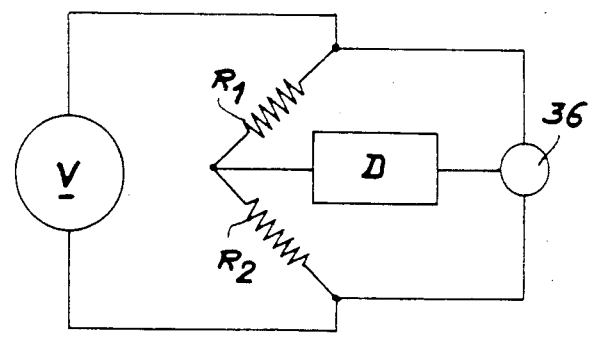
FIG. 5 The electric circuit associated with the magnetic device of FIG. 3 to make it possible to measure the moment of the torque about axis Z.

To this end, an electric circuit like that shown in FIG. 5 can be used. In said circuit two resistors $R_1$, $R_2$ are associated with the magnetoresistor 36 for forming a Wheatstone bridge. A voltage is applied between the common terminal to resistor $R_1$ and magnetoresistor 36 and the common terminal to resistor $R_2$ and magnetoresistor 36 by means of a voltage source V (or optionally a current source I for a better immunity to noise). It is thus possible to measure with the aid of a device D the voltage or current between magnetoresistor 36 and the common terminal to resistors $R_1$ and $R_2$, said voltage representing the moment $M_Z$ of the torque applied about axis Z.

Figure 6:
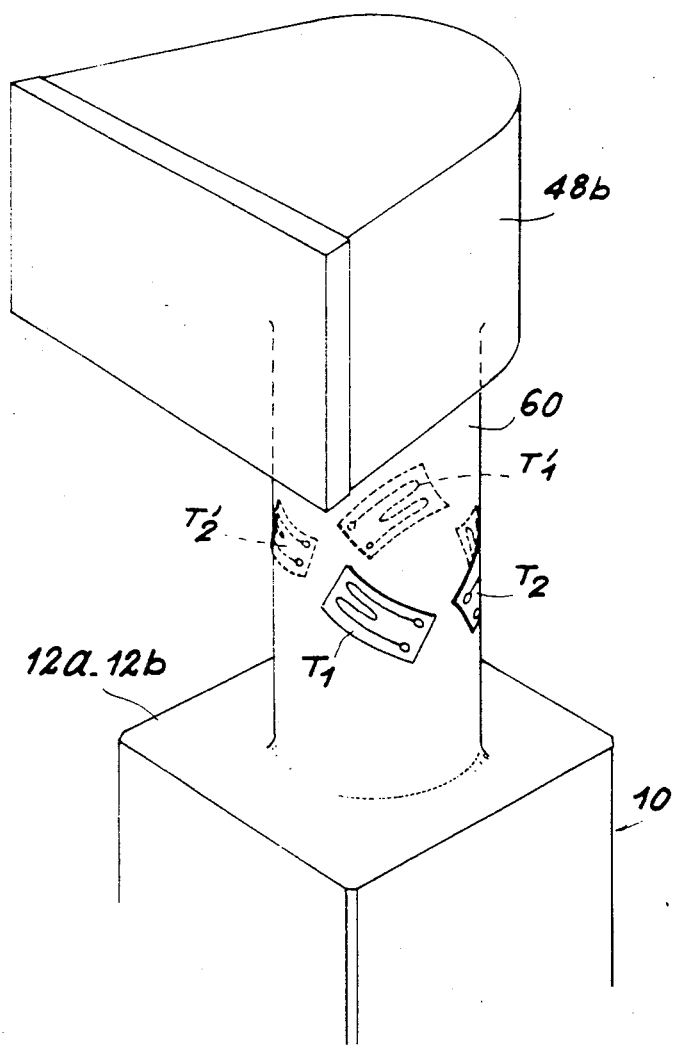
FIG. 6 A perspective view illustrating a second constructional variant of the pickup of FIG. 1, in which the moment of the torque about the longitudinal axis Z is measured by means of strain gauges placed on a flexible part in torsion.

A second solution of the problem for measuring moment $M_Z$ is shown in FIG. 6. In this solution, between one of the parts 12a and 12b of module 10 and a gripper 48b is placed a metal member 60 working in torsion about axis Z. By bonding strain gauges to said member working in torsion and by mounting these gauges in an electric measuring circuit, it is possible to determine in known manner the moment of the twisting torque exerted on said part, i.e. moment $M_Z$.

More specifically and as illustrated in FIG. 6, four gauges T1, T2, T'1, T'2 are placed at the same level along Z on member 60 and are circumferentially distributed at 90° from one another about said member. Gauges T1, T'1 on the one hand and T2, T'2 on the other are located at diametrically opposite locations oriented by 45° and in reverse direction with respect to axis Z. By placing these four gauges in an electric circuit comparable to that of FIG. 1, it is possible to measure moment $M_Z$. As a variant, only two gauges such as gauges T1, T'1 or T2, T'2 may be used.

Figure 7:
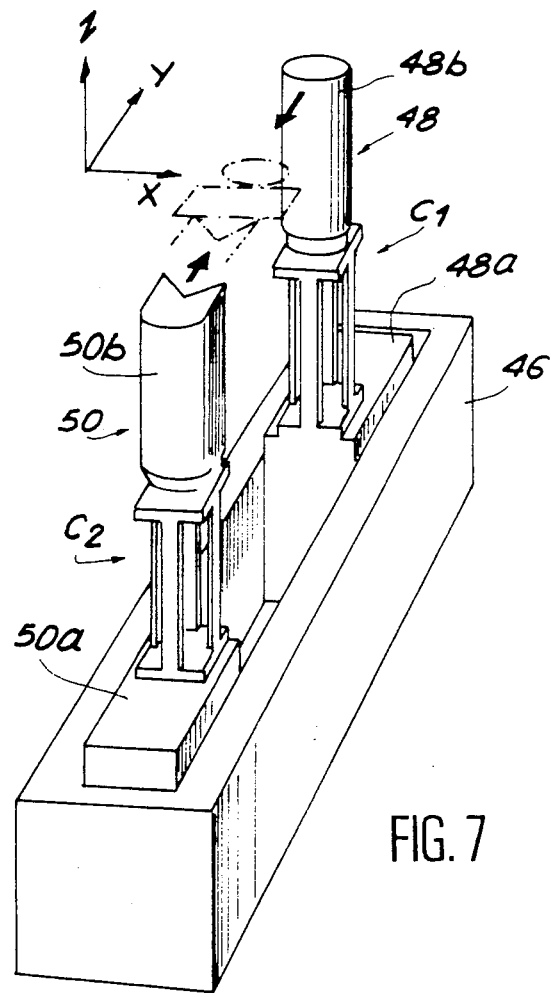
FIG. 7 A perspective view illustrating, as a non-limitative example, the application of the pickup of FIG. 1 to producing a gripper with two fingers.

FIG. 7 shows in a non-limitative exemplified embodiment an application using two force and torque measuring pickups according to the invention.

This application relates to a gripper 42 essentially constituted by a support 46 on which are mounted two fingers 48, 50. The fingers 48, 50 could be articulated on support 46. In the embodiment shown in FIG. 6, they remain constantly parallel to one another and move by sliding on support 46 under the effect of a not shown control means.

According to the invention, each of the fingers 48, 50 has, between its base 48a, 50a respectively and its gripping end 48b, 50b respectively, a force and torque measuring pickup $C_1$, $C_2$ according to the invention.

Depending on whether pickup $C_1$, $C_2$ measure five or six magnitudes or quantities (forces and torques) in each of the fingers of the gripper, it is possible to obtain ten, eleven or twelve measurements.

Thus and in exemplified manner, pickup $C_1$ mounted in finger 48 can be a pickup measuring three forces and two torques, like the basic module 10 described hereinbefore with reference to FIG. 1. Gripper 48b constituting the end of said finger is then a cylindrical part mounted so as to be freely rotatable about an axis coinciding with the longitudinal axis of pickup 10 along axis Z. The moment of the torque applied about axis Z is consequently still zero and justifies the absence of means used for measuring this moment.

However, the other finger 50 can have a pickup $C_2$ making it possible to measure three forces and three torques. Pickup $C_2$ is then constituted by module 10, e.g. equipped with the magnetoresistor means described hereinbefore relative to FIGS. 3 and 4.

The gripping end 50b of finger 50 is then constituted by a part e.g. having a gripping surface with a section in the form of a V in plane XY and as illustrated in FIG. 6. As described hereinbefore with reference to FIGS. 3 and 4, gripping part 50b can pivot slightly about an axis coinciding with the longitudinal axis Z of pickup 10, so as to better adapt to the object which it is wished to grasp.

A gripper produced in the manner described hereinbefore relative to FIG. 7 can grip any object, whilst making it possible to obtain information at all times on the interaction components between said object and each of the gripper fingers.

Obviously the invention is not limited to this application and also relates to the case where pickups according to the invention are introduced into each of the fingers of a gripper having three or more fingers. Such a gripper will be used for solving more complex cases, e.g. when an object has to be grasped at three points. By placing a pickup with 5° or 6° of freedom according to the invention in each of the fingers, the fingers or the complete gripper can then grasp an object without exerting unnecessary stresses or strains on the latter resulting from an incorrect object-gripper positioning and without there being any sliding of the object on the surface where it is placed.

In another application of the invention (not shown), a pickup constituted by the module 10 described relative to FIG. 1 and optionally supplemented by the measurement of the torque about axis Z in the manner described relative to FIG. 3, is placed in a follower for following the periphery of an object with contact. One of the two parts constituting the pickup is then fixed by its intermediate branch to a support constituted by a controlled carrier means, such as a robot. The other part of the pickup also carries by means of its intermediate branch a rod extending along the longitudinal axis Z and which is terminated by a spherical portion. By bringing the latter into contact with the part whose profile is to be obtained, the measurement of the forces and torques carried out by this pickup making it possible to supply the carrier means or robot with indormation interpretable as an orientation or trajectory change instruction, so that the sphere remains dependent on a contact with the part to be followed.

One of the uses of such a follower can consist of an auto-adaptation of a robot having to perform work on the contour of a member, whereof the production processes do not permit a perfect reproducibility between individual items. The instructions supplied by the pickup can e.g. be superimposed on an ideal prerecorded trajectory, so as to permit its adaptation to each part without modifying the standard programme.

These few examples of possible applications of the pickup according to the invention clearly show the essential advantages thereof compared with existing pickups.

Thus, the very small overall dimensions of the pickup, particularly in the XY plane orthogonal to its longitudinal axis of symmetry Z makes it possible to measure three forces and, as a function of the case, two or three torques for each of the contact surfaces of a gripping system. The interaction torsor between said gripping system and the gripped object can thus be completely known, which could not be realized up to now.

To the small overall dimensions must be added the modular character of the pickup according to the invention making it possible to produce for each application, grippers having the desired number of fingers and the number of measurements necessary in each of these fingers.

Moreover, another important advantage of the pickup according to the invention is a good decoupling between the measured quantities. This characteristic has been experimentally proved and is particularly important for the quality of the measurements.

Finally, it should be noted that the small dimensions of the pickup are not obtained at the price of eliminating continuous components of the measured signals, such as is e.g. the case in piezoelectric devices, whose very nature only makes it possible to detect strain variations and not those of absolute or permanent strains.

Obviously, the pickup described in exemplified manner hereinbefore can undergo several modifications without passing outside the scope of the invention. Thus, it has been seen that the two parts constituting the basic module can slightly differ from one another, particularly with regards to their intermediate branches. Moreover, their monolithic character is desirable, but not necessary and the measuring branches can also be rigidly fixed to the intermediate branches. Finally, the measuring branches need not be perfectly straight and parallel to one another and their section need not be uniform or rectangular, provided that their deformations under the effect of forces and torques remain comparable to those described hereinbefore.

What is claimed is:

1. A pickup for measuring forces and torques, wherein it comprises two U-shaped parts, each having two measuring branches connected at their base by an intermediate branch, the branches of the same part passing through a plane of symmetry containing a longitudinal axis of symmetry Z, said parts being placed in reverse direction with said planes of symmetry of each part which are orthogonal with respect to one another, whilst their axes of symmetry coincide, the ends of the measuring branches of each of said parts being connected to the intermediate branch of the other part by two cylindrical links, each authorizing a rotation and a translation along the same axis X, Y orthogonal to the axis Z and parallel to the plane of symmetry of said other part, each of the measuring branches being able to deform in said plane of symmetry of the part to which said branch belongs, strain gauges being placed on these measuring branches so as to measure the forces exerted in three directions X, Y and Z and the moments of the torques about directions X and Y.

2. A pickup according to claim 1, wherein each of the measuring branches has two parallel, opposite, planar faces orthogonal to the plane of symmetry of the part to which said branch belongs and parallel to the longitudinal axis of symmetry Z, the strain gauges being placed on these faces.

3. A pickup according to claim 2, wherein four strain gauges are arranged in pairs on the opposite faces of one of the measuring branches of each part respectively in the vicinity of the base and the end of said branch, so as to measure the forces exerted in directions X and Y.

4. A pickup according to claim 2, wherein two strain gauges are located on the opposite faces of one of the measuring branches of one of the parts and two strain gauges are placed on the opposite faces of one of the measuring branches of the other part, so as to measure the forces exerted in direction Z.

5. A pickup according to claim 2, wherein four strain gauges are placed on the opposite faces of two measuring branches of each of the parts substantially at the same level along axis Z, so as to measure the moments of the torques exerted about directions X and Y.

6. A pickup according to claim 1, wherein each of the cylindrical links comprises a cylindrical pin traversing the end of one of the measuring branches and lugs formed on either side of said end of the intermediate branch of the U-shaped part to which said measuring branch does not belong, an elastic centring member being mounted on the pin between the end of the measuring branch and each of the lugs.

7. A pickup according to claim 1, wherein the intermediate branch of one of the parts supports a gripper so as to rotate about axis Z, return or restoring means being provided in order to draw the gripper towards an angular inoperative position about axis Z, measuring means being interposed between said part and the gripper for measuring an angular displacement with respect to said angular inoperative position.

8. A pickup according to claim 7, wherein the measuring means is a magnetic device.

9. A pickup according to claim 7, wherein the measuring means is an optical device.

10. A pickup according to claim 1, wherein one of said parts rigidly supports a member which is flexible in torsion about axis Z, at least one pair of strain gauges being positioned on said member which is flexible in torsion.

11. A follower able to follow the contour of an object by contact thereof with the end of a rod mounted on a support, wherein said rod is mounted on the support by means of a pickup according to claim 1, the parts of the pickup being respectively fixed by their intermediate branches to the support and to the rod of the follower.

12. A gripper with at least two gripping fingers, each having a gripping end and a base by which the fingers are mounted in mobile manner on a support, wherein each gripping finger comprises a pickup according to claim 1, said U-shaped parts of each pickup being respectively fixed by their intermediate branches to the base and to the gripping end of the finger to which it belongs.

* * * * *